(12) United States Patent
Lammer et al.

(10) Patent No.: US 12,226,677 B2
(45) Date of Patent: Feb. 18, 2025

(54) BALL GAME RACKET FRAME AND METHOD FOR MANUFACTURING A BALL GAME RACKET

(71) Applicant: Head Technology GmbH, Kennelbach (AT)

(72) Inventors: Herfried Lammer, St. Veit an der Glan (AT); Ralf Schwenger, Weiler im Allgäu (DE); Stefan Mohr, Dornbirn (AT)

(73) Assignee: Head Technology GmbH, Kennelbach (AT)

( * ) Notice: Subject to any disclaimer, the term of this patent is extended or adjusted under 35 U.S.C. 154(b) by 705 days.

(21) Appl. No.: 17/444,505

(22) Filed: Aug. 5, 2021

(65) Prior Publication Data

US 2023/0045155 A1 Feb. 9, 2023

(51) Int. Cl.
*A63B 49/10* (2015.01)
*A63B 60/54* (2015.01)

(52) U.S. Cl.
CPC .............. *A63B 49/10* (2013.01); *A63B 60/54* (2015.10); *A63B 2209/023* (2013.01)

(58) Field of Classification Search
CPC ................................ A63B 49/10; B05D 1/045
See application file for complete search history.

(56) References Cited

U.S. PATENT DOCUMENTS

| 3,889,951 A * | 6/1975 | Schaefer | A63B 60/08 273/DIG. 23 |
| 4,145,047 A * | 3/1979 | Nagamoto | A63B 49/10 473/521 |
| 8,080,288 B2 * | 12/2011 | Van Raemdonck | B62K 19/16 428/297.4 |

(Continued)

FOREIGN PATENT DOCUMENTS

MX 2015016204 A * 5/2015

OTHER PUBLICATIONS

Lineo—FlaxPreg, "FlaxPreg Breakthrough Eco-Friendly Technology Opens Up New Markets," archived by the Internet Archive on Apr. 10, 2017, https://web.archive.org/web/20170410221837/http://www.lineo.eu/download/Business%20Case%20-%20Tennis%20racket.pdf (Year: 2017).*

(Continued)

*Primary Examiner* — Jeffrey S Vanderveen
(74) *Attorney, Agent, or Firm* — Bookoff McAndrews, PLLC

(57) ABSTRACT

The invention relates to a ball game racket frame (12) including a head portion (14), a shaft portion (18) and a grip portion (20). The ball game racket frame (12) comprises a fiber composite material having fibers embedded in a matrix. At least 5% of the fibers are natural fibers in at least one cross-section (28, 28a, 28b, 28c, 28d, 28e) of a portion of the ball game racket frame (12).
The invention further relates to a ball game racket frame (12) in which the proportion of natural fibers in at least one (Continued)

cross-section (28b, 28c, 28d, 28e) of the shaft portion (18) and/or the grip portion (20), respectively, is greater than the proportion of natural fibers in at least one cross-section (28, 28a) of the head portion (14).

The invention further relates to a method for manufacturing such ball game racket frames (12).

20 Claims, 1 Drawing Sheet

(56) References Cited

U.S. PATENT DOCUMENTS

| | | | | |
|---|---|---|---|---|
| 8,512,175 | B2* | 8/2013 | Epling | A63B 59/51 |
| | | | | 473/566 |
| 10,071,528 | B2* | 9/2018 | Fischer | B29C 70/20 |
| 2014/0023820 | A1* | 1/2014 | Muhlbauer | B32B 27/04 |
| | | | | 428/113 |
| 2016/0060486 | A1* | 3/2016 | Schneider | C09D 183/06 |
| | | | | 428/447 |

OTHER PUBLICATIONS

Susheel Kalia, "Biodegradable Green Composites," 2016, John Wiley & Sons, p. 18-79 (Year: 2016).*

* cited by examiner

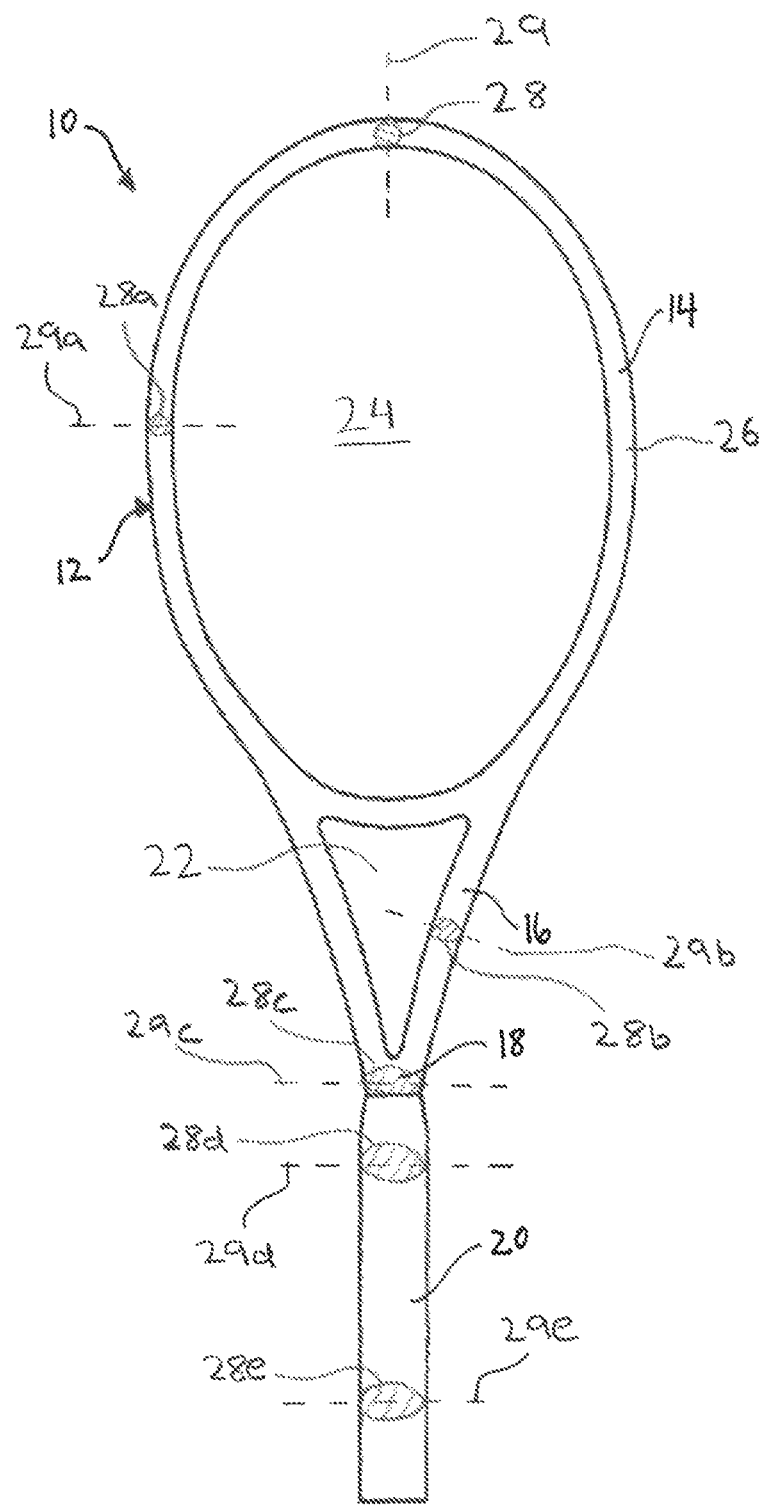

BALL GAME RACKET FRAME AND METHOD FOR MANUFACTURING A BALL GAME RACKET

Ball game rackets are available for a wide range of different leisure activities and/or sports. For instance, there is a relatively large market for tennis rackets with a broad selection of different available tennis rackets. Other leisure activities and/or sports, such as, but not limited to, badminton, squash, and table tennis, also form sizable markets with a variety of different ball game rackets available for users to choose from.

Ball game rackets, in particular tennis rackets, may be made from a variety of different materials. Simple, relatively low-priced ball game rackets are typically made of plastic or metal, such as aluminum. High-performance ball game rackets, on the other hand, are often made of more sophisticated and/or expensive material, such as carbon fiber, glass fiber or ceramic.

Such high-performance ball game rackets, in large part due to their more sophisticated and/or optimized material, offer a relatively light-weight construction while providing a relatively high stiffness to the respective ball game racket, which may reduce deformation of the ball game rackets during use, i.e., while striking a ball therewith.

However, ball game rackets made of such high-strength materials do not have all of the qualities a user may desire and/or expect from the respective ball game racket for the user's respective sport and/or leisure activity.

Thus, based on the prior art, there remains a need to further improve the qualities of ball game rackets.

It is therefore an object of the present invention to provide a ball game racket frame having improved characteristics during use thereof.

This object is achieved by a ball game racket frame defined by the features of claim 1 according to a first aspect. Variations and further developments are defined by the features of the dependent claims.

The ball game racket frame according to the first aspect includes a head portion, a shaft portion, and a grip portion.

The grip portion is configured to be gripped by a user, preferably by a user's hand, either by one hand or both hands of the user. For this purpose, the grip portion may include features which may facilitate gripping thereof, such as suitable dimensions, a suitable shape which suits the user's body part used to grip the grip portion and/or features which may reduce slipping between the user's body part which grips the grip portion, e.g., the user's hand(s), and the grip portion.

Preferably, the grip portion extends along a longitudinal axis to the shaft portion. In this case, the grip portion and the shaft portion may be aligned and may share a common longitudinal axis.

Alternatively, the grip portion and the shaft portion may be angled relative to each other, instead of being aligned and sharing a common longitudinal axis. For instance, the grip portion and the shaft portion may be angled relative to one another by at least 5°, preferably at least 10°, more preferably at least 15°, most preferably at least 20°. Alternatively, or additionally, the angle formed between the grip portion and the shaft portion may be at most 5°, more preferably at most 10°, more preferably at most 15°, most preferably at most 20°.

Preferably, the grip portion merges to the shaft portion. In other words, the grip portion may abut the shaft portion. However, it is also feasible that the grip portion and the shaft portion are separate, e.g., spaced from each other, preferably along a common longitudinal axis.

Preferably, the shaft portion extends and/or merges to the head portion. In other words, the shaft portion may abut the head portion at least partially.

The shaft portion may split into two sections leading to the head portion. This section of the shaft portion is often referred to as a throat portion.

The throat portion may be open, i.e., an opening may be formed between the two split sections. Alternatively, the throat portion may be closed. In this case, the throat portion does not include said opening.

The head portion may provide a striking surface, such as a substantially planar surface, for striking a ball during use in a ball game sport and/or leisure activity. The striking surface does not have to be substantially planar. Instead, the striking surface may be curved and/or angled in sections thereof.

Alternatively, or additionally, additional means may be provided for providing a striking surface for striking a ball during use in a ball game sport and/or ball game activity.

For instance, a string bed plane comprising a plurality of strings may be provided and attached to at least a portion of the head portion. Such a string bed plane is commonly used for, amongst others but not limited to, tennis rackets, squash rackets and badminton rackets. The strings may be attached to a peripheral section of the head portion and may extend across an opening defined within the peripheral section of the head portion.

Alternatively, the head portion may have a solid, preferably continuous and uninterrupted, surface instead of a string bed plane, which may provide the striking surface for striking a ball during use in a ball game sport and/or ball game activity. Such a striking surface may also have at least one opening formed therein, the opening preferably being smaller than the size of the ball to be struck by the corresponding ball game racket.

Preferably, the ball game racket frame comprises a fiber composite material having fibers embedded in a matrix. The ball game racket may have a plurality of fiber composite materials, the fiber composite materials being of the same type or of different types. The composite materials may differ from each other in the type of matrix and/or the type of fibers used in the respective composite materials.

The matrix may be any type of matrix material used for composite material, such as epoxy resin.

The fibers may include a single type of fibers or a plurality of different types of fibers.

The fibers may include synthetic and/or natural fibers. In case synthetic and natural fibers are used, the synthetic and natural fibers are preferably embedded in the same matrix to form a fiber composite material.

The head portion and/or the shaft portion and/or the grip portion may at least partially be made of one or more fiber composite materials including natural fibers. Thus, natural fibers may be arranged in the head portion and/or the shaft portion and/or the grip portion.

The synthetic fibers may include, but are not limited to, carbon fibers, glass fibers, aramid fibers, ultra-high-molecular-weight polyethylene fibers, and thermoset liquid-crystalline polyoxazole fibers.

The natural fibers may include, but are not limited to, flax, hemp, jute, kenaf, ramie, nettle, sisal, henequen, pineapple leaf fiber (PALF), Abaca, oil palm empty fruit bunch (OPEFB), oil palm mesocarp fiber (OPMF), cotton, coir, nanocellulose and bamboo.

Preferably, at least 5% of the fibers in the fiber composite material are natural fibers in at least one cross-section of a portion of the ball game racket frame, more preferably in a plurality of cross-sections of a portion or a plurality of portions of the ball game racket frame.

More preferably, at least 10% of the fibers in the fiber composite material are natural fibers in at least one cross-section of a portion of the ball game racket frame, more preferably in a plurality of cross-sections of a portion or a plurality of portions of the ball game racket frame. For instance, at least 5% of the fibers in the fiber composite material may be natural fibers in at least one cross-section of the head portion and/or the shaft portion and/or the grip portion, respectively.

In particular, the shaft portion may be exposed less to moisture than the grip portion since the grip portion may be exposed to sweat produced by the user's body part gripping the grip portion, e.g., the user's hands. The damping effects of the natural fibers may be particularly effective and/or advantageous in the shaft portion.

Thus, a higher proportion of natural fibers, e.g., at least 5%, preferably at least 10%, more preferably at least 15%, most preferably at least 20%, in at least one cross-section of the shaft portion may be advantageous. Thus, in general, the proportion of natural fibers in at least one cross-section of the shaft portion may be greater than the proportion of natural fibers in at least one cross-section of the head portion and/or the grip portion, respectively. For instance, natural fibers may be omitted entirely in the grip portion and/or in the head portion.

However, in addition to providing natural fibers in the shaft portion, natural fibers may also be included in the grip portion and/or in the head portion.

A protective layer, such as a wrap, may be provided around at least a portion of the grip portion to prevent sweat produced by the user from being absorbed by the natural fibers at the grip portion or at least reduce the amount of sweat absorbed by the natural fibers at the grip portion.

Several ball game rackets have been or are being offered on the market with flax or other natural fibers provided in the respective ball game racket frames. However, the amount of natural fibers, e.g., flax, provided in the respective ball game racket frames is minimal, commonly at most 0.5%.

In most cases, the natural fibers are provided in the respective ball game racket frames for marketing purposes only, e.g., in order to promote the respective ball game racket and/or the respective manufacturer of the ball game racket as being particularly ecologically friendly, and/or for aesthetic reasons.

However, natural fibers, at least when used in larger proportions in a ball game racket frame, such as manufacturing the ball game racket frame entirely or at least mostly from natural fibers, may actually negatively impact the overall performance of a ball game racket.

For instance, natural fibers tend to have a relatively high degree of moisture absorption. Moisture absorption by the natural fibers may lead to a reduction in tensile strength of the natural fibers, which may be undesirable and/or detrimental to the performance of the ball game racket when natural fibers are included in the ball game racket frame. This is particularly relevant for many ball game racket frames since, in many instances, ball game rackets are used outdoors, where they may be subjected to more severe and/or moist conditions, e.g., rain, than indoors.

Moreover, sweat produced by the user, in particular on the hand or hands of the user which may grip the grip portion, may also contribute to moisture which may be absorbed by the natural fibers.

Moreover, natural fibers have a natural protection layer surrounding at least sections thereof. This may decrease the adhesiveness of the natural fibers, e.g., the adhesiveness of the natural fibers to a matrix material in the composite material. This may, in turn, decrease the load transfer qualities from the matrix to the natural fibers and/or vice versa. This may increase the amount of fibers required in order to provide a desired stiffness of the ball game racket frame, which may increase the costs for manufacturing and/or the weight of the respective ball game racket frame.

In addition, natural fibers tend to have a higher variance in their properties, such as stiffness and/or their dimensions, than synthetic fibers. In others words, natural fibers have a relatively high inconsistency in their properties, which may make it difficult to provide a consistent quality of ball game racket frames during production, in particular when using a higher proportion of natural fibers than known in the prior art, i.e., more than approximately 0.5%.

Hence, natural fibers have been regarded in the past as being detrimental to the performance of a ball game racket frame during use. Thus, natural fibers have never been contemplated to be used in a ball game racket frame to substantially contribute to the performance-enhancement of ball game rackets by using higher proportions of the natural fibers in ball game racket frames than previously known and/or used. Thus, the amount of natural fibers provided in the ball game racket frame has been limited in the prior art to a very small amount, i.e., at most 0.5%.

By contrast, the present invention makes use of natural fibers as performance-enhancing elements in a ball game racket frame by recognizing that providing a larger predetermined amount of natural fibers in a ball game racket frame and/or in particular sections of a ball game racket frame than previously known, the performance qualities of the ball game racket frame and thus of the ball game racket may be enhanced as a result of the natural fibers.

Hence, providing at least 5%, more preferably at least 10%, of the fibers in the fiber composite material as natural fibers in at least one cross-section of a portion of the ball game racket frame, more preferably in a plurality of cross-sections of a portion or a plurality of portions of the ball game racket frame, may allow the natural fibers to contribute to performance-enhancing effects to the ball game racket frame during use thereof.

For instance, natural fibers have been found to improve the damping characteristics of the ball game racket frame when provided therein.

Thus, natural fibers may absorb forces, which may be applied to the ball game racket frame, in particular when striking a ball with the corresponding ball game racket during use, to a higher degree than other materials, such as synthetic fibers and/or metal and/or plastic and/or ceramic.

This may increase the performance of the ball game racket during use since, e.g., less forces may be transferred through the ball game racket frame to the user's body, e.g., the user's arm, due to the increased absorbance of the forces by the ball game racket frame.

As a result, the use's performance when using the ball game racket may increase and/or the risk of injury to the user, e.g., to the user's arm when gripping the ball game racket during use, e.g., due to an excessive and/or brute transfer of force from the ball game racket frame to the user's body, may be reduced may be reduced.

Moreover, the higher degree of force absorbance by the ball game racket frame due to the natural fibers may decrease the ball game racket frame's vulnerability to damage when struck by one or more forces, e.g., when striking a ball or another object, such as a fence or chair.

In particular, composite materials made with synthetic fibers are known to be particularly vulnerable to damage by, e.g., cracking. Hence, by providing natural fibers having a proportion of at least 5%, more preferably at least 10%, the ball game racket frame's vulnerability to damage may be decreased compared to composite materials having no natural fibers or having a relatively low proportion of natural fibers such that the natural fibers present have no or only minimal impact on the performance characteristics of the ball game racket frame during use.

In addition, it has been found that natural fibers may increase the sound emitting characteristics of the ball game racket frame when striking a ball during use. For instance, the intensity of the sound emitted when the ball game racket frame strikes a ball may be reduced overall as a result of the natural fibers, at least in part due to the higher degree of absorbance of forces effected by the natural fibers, as described above.

Moreover, the frequency of the sound emitted when the ball game racket frame strikes a ball may be reduced to lower frequencies due to the natural fibers, which is typically perceived as being more pleasant or at least less annoying by the user and/or to persons nearby.

Thus, in general natural fibers may provide sound characteristics of the ball game racket frame when striking a ball during use which are more appealing and/or less annoying to the user and/or to persons nearby.

Furthermore, at least some natural fibers have a higher specific stiffness, i.e., the ratio of the respective Young's Modulus to the respective density of the natural fibers, than some synthetic fibers, such as glass fibers. Hence, natural fibers may provide a relatively high stiffness considering their relatively low density.

Thus, providing natural fibers having a proportion of at least 5%, more preferably at least 10%, in at least one cross-section of a portion of the ball game racket frame may provide the effects described above, with respect to natural fibers, to a degree which may contribute to improving at least some of the characteristics, e.g., a performance-enhancement, of a corresponding ball game racket having such a ball game racket frame during use.

The proportion, i.e., the percentage, of the natural fibers in the fiber composite material as provided above, e.g., at least 5%, more preferably at least 10%, may relate to a percentage by volume in the respective fiber composite material along a particular cross-section of a portion of the ball game racket frame.

The natural fibers may be arranged at least in sections of the head portion and/or the shaft portion and/or the grip portion.

The proportion of the natural fibers may be substantially constant within each of the head portion and/or the shaft portion and/or the grip portion. Alternatively, the proportion of the natural fibers may vary within each of the head portion and/or the shaft portion and/or the grip portion. In other words, the head portion and/or the shaft portion and/or the grip portion may each have at least two cross-sections which have substantially different proportions, i.e., percentages, of natural fibers provided therein.

Thus, for instance, a first cross-section of the head portion may have a first proportion of natural fibers, e.g., 5%, and a second cross-section of the head portion may have a second proportion of natural fibers which is higher or lower than the first proportion, e.g., 10%.

The same may apply to the shaft portion and/or the grip portion. Thus, for instance, a first cross-section of the shaft portion and/or of the grip portion may have a first proportion of natural fibers, e.g., 5%, and a second cross-section of the shaft portion or grip portion, respectively, may have a second proportion of natural fibers which is higher or lower than the first proportion, e.g., 10%.

Moreover, the proportion of the natural fibers in at least one cross-section of one of the head portion, the shaft portion, and the grip portion, respectively, may differ from the proportion of the natural fibers in at least one cross-section of the other and/or others of the head portion, the shaft portion, and the grip portion.

Providing such different proportions of natural fibers in different portions of the ball game racket frame may allow a certain portion or portions of the ball game racket frame to be configured differently, and thus have different properties which at least partially result from the natural fibers, than at least another portion or portions of the ball game racket frame with respect to the amount of natural fibers disposed therein.

This may allow certain regions of the ball game racket frame to be individually optimized with respect to a particular characteristic or characteristics, e.g., to suit a particular type of performance and/or playing style of the user during the respective sport and/or leisure activity.

For instance, the amount of natural fibers may be selected in a first portion or portions for an increased stiffness and/or more positive effects with respect to other first properties in the first portion or portions. In contrast, the amount of natural fibers in a second portion or portions may be different compared to the first portion or portions, i.e., lower or higher, for more positive effects on the same first properties as in the first portion or portions or different properties in the second portion or portions, e.g., for increased sound properties, e.g., louder or quieter.

Moreover, providing different proportions of natural fibers in different regions of the ball game racket frame, as described above, may also allow detrimental effects of the natural fibers on the performance of the ball game racket frame to be reduced, e.g., by decreasing the proportion, i.e., percentage, of natural fibers in a certain region or regions of the ball game racket frame which may be particularly sensitive to and/or be negatively affected by the properties of the natural fibers. This may be the case when the negative effects of the natural fibers outweigh the positive effects of the natural fibers at a certain proportion thereof in that particular region or regions. Thus, by reducing the proportion of natural fibers in such a region or regions detrimental effects of the natural fibers on the performance of the ball game racket frame may be reduced.

Providing different proportions of natural fibers in different regions of the ball game racket frame may also allow the positive effects of the natural fibers to be optimally utilized, in particular in regions of the ball game racket frame, which may be less sensitive to the properties of the natural fibers, by increasing the proportion of natural fibers in those regions in comparison with the other regions which are more sensitive and/or where the negative effects of the natural fibers would outweigh the positive effects of the natural fibers if the same higher proportion of natural fibers were to be used there.

The minimum amount of fibers may be higher than 5%. Thus, at least 10%, preferably at least 15%, more preferably at least 20%, more preferably at least 25%, more preferably at least 30%, more preferably at least 35%, more preferably at least 40%, more preferably at least 45%, most preferably at least 50%, of the fibers in the fiber composite material are natural fibers.

The amount of natural fibers in the fiber composite material may also be limited to a maximum proportion, i.e., percentage. Thus, the amount of natural fibers in the fiber composite material may be at most 90% or less, preferably 80% or less, more preferably 70% or less, more preferably 60% or less, more preferably 50% or less, more preferably 40% or less, more preferably 30% or less, most preferably 20% or less.

Preferably, the amount of natural fibers in the fiber composite material is in a range from 5% to 90%, more preferably from 10% to 80%, more preferably from 15% to 70%, more preferably from 20% to 60%, more preferably from 20% to 50%, most preferably from 25% to 40%.

Preferably, the natural fibers include fibers of at least one of the following fibers: flax, hemp, kenaf, jute, and ramie.

Further natural fibers are also feasible. These include, but are not limited to, nettle, sisal, henequen, pineapple leaf fiber (PALF), Abaca, oil palm empty fruit bunch (OPEFB), oil palm mesocarp fiber (OPMF), cotton, coir, nanocellulose, bamboo, and banana tree.

Preferably, at most 90% of the fibers are natural fibers. Limiting the proportion of natural fibers to 90% may limit any potentially detrimental effects the natural fibers may have on one or more performance characteristics of the ball game racket frame during use in the respective leisure activity and/or sport.

Preferably, the fibers comprise synthetic fibers, preferably carbon and/or glass fibers.

Natural fibers have been found to have a particularly positive effect on the performance characteristics of a ball game racket frame when combined with synthetic fibers, in particular carbon and/or glass fibers.

For instance, the positive effects of natural fibers and the positive effects of synthetic fibers on the characteristics of the ball game racket frame, in particular with regard to the performance characteristics thereof during use, may be optimally combined to enhance the overall qualities of the ball game racket frame.

Moreover, the effects of synthetic fibers and the effects of natural fibers together may provide a counterbalanced effect to at least partially compensate negative effects, or at least potential negative effects, which the natural fibers and/or synthetic fibers may have. This may also enhance the performance characteristics of the ball game racket frame during use thereof.

For instance, as described above, natural fibers tend to have a higher variance in their properties, such as stiffness and/or their dimensions, than synthetic fibers. In other words, natural fibers have a relatively high inconsistency in their properties, which may make it difficult to provide a consistent quality of ball game racket frames during production.

Thus, the synthetic fibers provided in the composite material may at least partially compensate the higher variance and inconsistency of the properties of natural fibers.

Moreover, the synthetic fibers may at least partially compensate a reduced rigidity of the natural fibers, either due to an inherently lower rigidity compared to synthetic fibers and/or due to moisture absorption.

The natural fibers, on the other hand, may at least partially compensate negative properties of the synthetic fibers, such as lower damping properties and/or poorer sound emitting properties.

Preferably, the proportion of natural fibers in at least one cross-section of the shaft portion and/or of the grip portion is greater than the proportion of natural fibers in at least one cross-section of the head portion.

As described above, providing proportions of natural fibers in different regions of the ball game racket frame, e.g., a higher proportion of natural fibers in the shaft portion and/or in the grip portion than in the head portion, may allow the natural fibers to have a higher or lower effect or effects on certain performance characteristics in different portions of the ball game racket frame.

This may allow regions of the ball game racket frame to be individually optimized with respect to a particular desired characteristic or characteristics.

Thus, providing the shaft portion and/or the grip portion with a higher proportion of natural fibers than in the head portion may increase the force absorbance characteristics in the shaft portion and/or in the grip portion.

Since the shaft portion and/or the grip portion of the ball game racket frame are typically in direct contact with the user or are at least closer to the user's body part, e.g., the user's hand(s), which grips the grip portion, than the head portion, providing increased force absorbance characteristics in the shaft portion and/or in the grip portion may be a particularly effective and/or efficient manner of decreasing the transfer of forces from the ball game racket frame to the user's body. As a result, a more comfortable feeling to the user during use of the corresponding ball game racket may be provided and/or the risk of injury to the user during use, e.g., due to an excessive and/or brute transfer of force from the ball game racket frame to the user's body, may be reduced.

Preferably, at least 10% of the fibers in the shaft portion and/or in the grip portion of at least one cross-section thereof are natural fibers. By providing a proportion of natural fiber in the shaft portion and/or in the grip portion of at least 10%, the properties of the natural fibers may positively affect at least some of the performance characteristics of the ball game racket frame, at least in the shaft portion and/or in the grip portion, during use.

For instance, the degree of absorbance of forces by the ball game racket frame may be increased and/or the sound characteristics of the ball game racket frame when striking a ball during use may be improved and/or be more appealing to the user and/or to persons nearby, as described above, at least in part as a result of the natural fibers.

Preferably, at most 2% of the fibers in the head portion are natural fibers.

By providing a proportion of natural fiber in the head portion of at most 2%, the properties of the natural fibers may affect and/or alter the characteristics of the head portion, in particular during use of the ball game racket frame, to a lesser degree than in the shaft portion and/or in the grip portion when at least 10% of the fibers in at least one cross-section of the shaft portion and/or of the grip portion, respectively, are natural fibers.

This may be desirable, e.g., to increase the stiffness in the head portion by using a higher proportion of synthetic fibers, e.g., carbon fibers, which may provide a higher stiffness than natural fibers in the head portion than in the shaft portion and/or in the grip portion.

On the other hand, the shaft portion and/or the grip portion may benefit from a higher proportion of natural fibers in that the damping characteristics may be increased in the shaft portion and/or the grip portion as a result of the higher proportion of natural fibers provided therein.

Moreover, a reduced stiffness in the shaft portion and/or the grip portion, compared with a configuration in which less natural fibers were to be used in the shaft portion and/or the grip portion, may be less critical in the shaft portion and/or the grip portion than in the head portion.

Furthermore, the increased damping and/or sound-altering effects of the natural fibers in the shaft portion and/or the grip portion, as detailed above, may outweigh the reduced stiffness which may be caused by the natural fibers compared with high-strength synthetic fibers, e.g., carbon fibers.

Preferably, the ball game racket frame is at least partially coated by a thermoplastic layer, at least in some regions of the ball game racket frame having natural fibers.

As detailed in the beginning, natural fibers tend to have a relatively high degree of moisture absorption. Moisture absorption by the natural fibers may lead to a reduction in tensile strength of the natural fibers, which may be undesirable and/or detrimental to the performance of the ball game racket when natural fibers are included in the ball game racket frame. This is particularly relevant for many ball game racket frames since, in many instances, ball game rackets are used outdoors, where they may be subjected to more severe and/or moist conditions, e.g., rain, than indoors.

Thus, by coating the ball game racket frame at least partially with a thermoplastic layer the risk of moisture penetrating the ball game racket frame and being absorbed by the natural fibers may be eliminated or at least reduced by providing a barrier between the natural fibers and the, potentially moist and/or humid, environment. This may prevent, or at least limit, a reduction in performance of the ball game racket due to moisture absorption in the natural fibers.

The thermoplastic material of the thermoplastic layer may comprise at least one of polyamide (PA), polylactides (PLA), and Polyethylene terephthalate (PET).

The thermoplastic layer may have a layer thickness ranging from 0.1 to 0.3 mm at least partially along the ball game racket frame.

Preferably, the ball game racket frame is at least partially coated by a powder coating layer, at least in some regions of the ball game racket frame having natural fibers.

Similar to the thermoplastic coating described above, the powder coating layer may also provide a barrier between the natural fibers and the, potentially moist and/or humid, environment, which may prevent moisture from penetrating the ball game racket frame and being absorbed by the natural fibers or at least reducing the amount of moisture which may penetrate the ball game racket frame and be absorbed by the natural fibers.

A powder coating may have an advantage over a thermoplastic coating in that the powder coating, due to the use of electrostatic coating during powder coating, may cover areas of the ball game racket frame which are difficult to access, e.g., bore holes in the ball game racket frame, e.g., to attach strings forming a string bed plane to the ball game racket frame, more effectively than a thermoplastic layer. Such areas may thus be less protected than more accessible areas of the ball game racket frame when using only a thermoplastic layer.

Hence, a more effective barrier to prevent moisture from reaching the natural fibers may be provided by means of the powder coating as opposed to the thermoplastic coating.

On the other hand, applying a thermoplastic coating may be more cost-efficient and/or time-efficient than applying a powder coating.

The powder coating layer may have a layer thickness ranging from 80 μm to 150 μm at least partially along the ball game racket frame.

Preferably, the powder coating layer includes at least one of the following materials: thermoplastic powder and duroplastic powder.

Preferably, the natural fibers have been treated by washing the natural fibers with at least one of the following materials: an alkaline solution, water with a pH value ranging from 7 to 14, and enzymes.

Preferably, the natural fibers have been plasma treated.

As detailed at the beginning, natural fibers tend to have a natural protection layer surrounding at least sections thereof. This may decrease the adhesiveness of the natural fibers, e.g., the adhesiveness of the natural fibers to a matrix material in the composite material. This may, in turn, decrease the load transfer qualities from the matrix to the natural fibers and/or vice versa.

As a result, this may increase the total amount of fibers required in order to provide a desired stiffness of the ball game racket frame, which may increase the costs for manufacturing and/or the weight of the respective ball game racket frame.

By treating the natural fibers, e.g., by washing the natural fibers with at least one of the above-identified materials and/or by plasma treating the natural fibers, the adhesiveness of the natural fibers to a matrix material may be increased. This may increase the load transfer qualities from the matrix to the natural fibers and/or vice versa and may decrease the total amount of fibers required in order to provide a desired stiffness of the ball game racket frame, which may decrease the costs for manufacturing and/or the weight of the respective ball game racket frame.

In a second aspect, the present invention also relates to a ball game racket frame including a head portion, a shaft portion and a grip portion.

The features, configurations and/or advantages detailed at the beginning related to the first aspect apply accordingly to the second aspect.

The ball game racket frame comprises a fiber composite material having fibers embedded in a matrix.

Preferably, at least some of the fibers are natural fibers and the proportion of natural fibers in at least one cross-section of the shaft portion and/or the grip portion is greater than the proportion of natural fibers in at least one cross-section of the head portion.

Preferably, at least 10% of the fibers in at least one cross-section of the shaft portion and/or of the grip portion, respectively, are natural fibers.

Preferably, at most 2% of the fibers in the head portion are natural fibers.

By providing a proportion of natural fibers in the head portion of at most 2%, the properties of the natural fibers may affect and/or alter the characteristics of the head portion, in particular during use of the ball game racket frame, to a lesser degree than in the shaft portion and/or in the grip portion when at least 10% of the fibers in at least one cross-section of the shaft portion and/or of the grip portion are natural fibers, respectively.

This may be desirable, e.g., to increase the stiffness in the head portion by using a higher proportion of synthetic fibers, e.g., carbon fibers, which may provide a higher stiffness than natural fibers in the head portion. Achieving a higher stiffness in the head portion may be more important than in the shaft portion and/or in the grip portion.

On the other hand, the shaft portion and/or the grip portion may benefit from a higher proportion of natural fibers in that the damping characteristics may be increased in the shaft portion and/or the grip portion as a result of the higher proportion of natural fibers provided therein.

Moreover, a reduced stiffness in the shaft portion and/or the grip portion, compared with a configuration in which less natural fibers were to be used in the shaft portion and/or the grip portion, may be less critical in the shaft portion and/or the grip portion than in the head portion.

Furthermore, the increased damping and/or sound-altering effects due to the higher proportion of natural fibers in the shaft portion and/or the grip portion, as detailed above, may outweigh the reduced stiffness which may be caused by the natural fibers compared to high-strength synthetic fibers, e.g., carbon fibers.

The object set out at the beginning is also achieved by a method for manufacturing a ball game racket frame defined by the features of claim 15 according to a third aspect. Variations and further developments are defined by the features of the dependent claims.

The features, configurations and/or advantages detailed at the beginning related to the first aspect and/or second aspect apply accordingly to the method according to the third aspect.

The method includes the step of providing at least one prepreg layer having fibers, including natural fibers, embedded in a matrix.

The method further includes the step of forming the ball game racket frame at least partially from the prepreg layer, such that at least 5% of the fibers in at least in one cross-section of a portion of the ball game racket frame are natural fibers.

Preferably, the prepreg layer provided in step a) further has synthetic fibers embedded in the matrix.

Preferably, the natural fibers are treated in at least one fiber treatment process prior to being embedded in the matrix, the fiber treatment process including at least one treatment process of the following group: washing the natural fibers with an alkaline solution, washing the natural fibers with water having a pH value ranging from 7 to 14, washing the natural fibers with enzymes, and a plasma treatment.

Preferably, the natural fibers are washed with enzymes using at least one of the following enzymes: lipases, proteases, and peroxidases.

Preferably, the plasma treatment is performed using a reaction gas including at least one of the following group: methane, ethane, and ethene.

Preferably, the method further comprises at least partially coating the ball game racket frame, at least in some regions of the ball game racket frame having natural fibers, by at least one coating process including at least one of the following group: a thermoplastic coating process and a powder coating process.

The present invention also relates to a ball game racket having a ball game racket frame having any of the configurations and/or features described herein.

The following list of aspects provides alternative and/or further features of the invention:

1. A ball game racket frame, preferably a tennis racket frame, including a head portion, a shaft portion and a grip portion, wherein the ball game racket frame comprises a fiber composite material having fibers embedded in a matrix, wherein at least 2%, preferably at least 5%, more preferably at least 10%, more preferably at least 15%, most preferably at least 20%, of the fibers are natural fibers in at least one cross-section of a portion of the ball game racket frame, preferably in a plurality of cross-sections of a portion or a plurality of portions the ball game racket frame.
2. The ball game racket frame according to aspect 1, wherein the natural fibers include fibers of at least one of the following fibers: flax, hemp, jute, kenaf, ramie, nettle, sisal, henequen, pineapple leaf fiber (PALF), Abaca, oil palm empty fruit bunch (OPEFB), oil palm mesocarp fiber (OPMF), cotton, coir, nanocellulose, bamboo, and banana tree.
3. The ball game racket frame according to aspect 1, wherein at most 90%, preferably at most 80%, more preferably at most 70%, more preferably at most 60%, more preferably at most 50%, more preferably at most 40%, more preferably at most 30%, most preferably at most 20%, of the fibers are natural fibers.
4. The ball game racket frame according to aspect 1, wherein the fibers comprise synthetic fibers, preferably carbon and/or glass fibers.
5. The ball game racket frame according to aspect 1, wherein the head portion and/or the shaft portion and/or the grip portion includes natural fibers in at least one cross-section thereof.
6. The ball game racket frame according to aspect 1, wherein the proportion of natural fibers in at least one cross-section of the shaft portion and/or of the grip portion, respectively, is greater than the proportion of natural fibers in at least one cross-section of the head portion.
7. The ball game racket frame according to aspect 6, wherein at least 10% of the fibers in at least one cross-section of the shaft portion and/or of the grip portion, respectively, are natural fibers.
8. The ball game racket frame according to aspect 6, wherein at most 1%, preferably at most 2%, of the fibers in the head portion are natural fibers.
9. The ball game racket frame according to aspect 1, wherein the proportion of natural fibers in at least one cross-section of the shaft portion is greater than the proportion of natural fibers in at least one cross-section of the head portion and/or the grip portion, respectively.
10. The ball game racket frame according to aspect 9, wherein at least 10% of the fibers in at least one cross-section of the shaft portion are natural fibers.
11. The ball game racket frame according to aspect 9, wherein at most 1%, preferably at most 2%, of the fibers in the head portion and/or the grip portion, respectively, are natural fibers.
12. The ball game racket frame according to aspect 1, wherein the ball game racket frame is at least partially coated by a protection layer, preferably a thermoplastic layer, at least in some regions of the ball game racket frame having natural fibers.
13. The ball game racket frame according to aspect 1, wherein the ball game racket frame is at least partially coated by a powder coating layer, at least in some regions of the ball game racket frame having natural fibers.
14. The ball game racket frame according to aspect 13, wherein the powder coating layer includes at least one of the following materials: thermoplastic powder and duroplastic powder.
15. The ball game racket frame according to aspect 1, wherein the natural fibers have been treated by washing the natural fibers with at least one of the following materials: an alkaline solution, water with a PH value ranging from 7 to 14, and enzymes.
16. The ball game racket frame according to aspect 1, wherein the natural fibers have been plasma treated.
17. A ball game racket frame including a head portion, a shaft portion and a grip portion, wherein the ball game racket frame comprises a fiber composite material having fibers embedded in a matrix, wherein at least some of the fibers are natural fibers and wherein the proportion of natural fibers in at least one cross-section of the shaft portion and/or the grip portion, respectively, is greater than the proportion of natural fibers in at least one cross-section of the head portion.
18. The ball game racket frame according to aspect 17, wherein at least 5%, preferably at least 10%, of the fibers in at least one cross-section of the shaft portion and/or of the grip portion, respectively, are natural fibers.
19. A ball game racket having a ball game racket frame according to one of the preceding aspects.
20. A method for manufacturing a ball game racket frame, including the following steps:
 a) providing at least one prepreg layer having fibers, including natural fibers and preferably synthetic fibers, embedded in a matrix;
 b) forming the ball game racket frame at least partially from the prepreg layer, such that at least 5% of the fibers in at least in one cross-section of a portion of the ball game racket frame, preferably in a plurality of cross-sections of a portion or a plurality of portions of the ball game racket frame, are natural fibers.
21. The method according to aspect 20, wherein the prepreg layer provided in step a) further has synthetic fibers embedded in the matrix.
22. The method according to aspect 20, wherein the natural fibers are treated in at least one fiber treatment process prior to being embedded in the matrix, the fiber treatment process including at least one treatment process of the following group: washing the natural fibers with an alkaline solution, washing the natural fibers with water having a PH value ranging from 7 to 14, washing the natural fibers with enzymes, and a plasma treatment.
23. The method according to aspect 22, wherein the natural fibers are washed with enzymes using at least one of the following enzymes: lipases, proteases, and peroxidases.
24. The method according to aspect 22, wherein the plasma treatment is performed using a reaction gas including at least one of the following group: methane, ethane, and ethene.
25. The method according to aspect 20, further comprising at least partially coating the ball game racket frame, at least in some regions of the ball game racket frame having natural fibers, by at least one coating process including at least one of the following group: a thermoplastic coating process and a powder coating process.

Preferred embodiments of the present invention are further elucidated below with reference to the figures. The described embodiments do not limit the present invention.

FIG. 1 shows in a side view an embodiment of a ball game racket including a ball game racket frame according to the invention;

FIG. 1 shows a ball game racket 10. In mere exemplary manner, the ball game racket 10 is illustrated as a tennis racket. However, the ball game racket 10 may also be any other ball game racket used for striking a ball or other object, such as a shuttlecock, in a leisure activity and/or a sports activity.

For instance, the ball game racket 10 may be a badminton racket, a squash racket, or a paddle, such as for use in paddle ball or table tennis, or any other racket used in any other known racket sport.

The ball game racket 10 includes a ball game racket frame 12 having a head portion 14, a shaft portion 18 and a grip portion 20. As illustrated in FIG. 1, the ball game racket frame 12 may also include a throat portion 16 extending from the shaft portion 18 to the head portion 14.

The throat portion 16 may be open, in which case the throat portion 16 includes an opening 22, as illustrated in FIG. 1. Alternatively, the throat portion 16 may be closed, in which case the throat portion 16 does not include an opening, such as the opening 22 illustrated in FIG. 1.

The throat portion 16 essentially serves the purpose of splitting the shaft portion 18 into two sections to extend around a circumference of the head portion 14.

The throat portion 16 may also be omitted. In this case, the shaft portion 14 may be attached directly to the head portion 14.

The grip portion 20 may be configured to be gripped by a user, preferably by a user's hand, either by one hand or both hands of the user. For this purpose, the grip portion 20 may include features which may facilitate gripping thereof, such as suitable dimensions and/or a suitable shape and/or features which may increase the friction between the user's body, e.g., the user's palm, and the grip portion 20.

The grip portion 20 may include a soft material, e.g., softer than the material of the shaft portion 18 and/or the head portion 14, to provide a comfortable grip for the user.

The grip portion 20 extends along a longitudinal axis to the shaft portion 18.

The head portion 14 may comprise an opening 24 defined by a peripheral section 26 of the head portion 14, as shown in FIG. 1.

The peripheral section 26 may be configured in a substantially oval shape, as shown in FIG. 1.

Alternatively, the peripheral section 26 may be formed in any other shape, e.g., circular, rectangular, triangular, etc.

A string bed plane comprising a plurality of strings may be provided (not shown) and attached to at least a portion of the peripheral section 26 and extending across at least a portion of the opening 24.

Such a string bed plane may provide a striking surface for striking a ball during use in a ball game sport and/or leisure activity.

Alternatively, the opening 24 may be omitted in the head portion 14. In this case, the head portion 14 may have a solid, preferably continuous and uninterrupted, surface instead of a string bed plane, which may provide the striking surface for striking a ball during use in a ball game sport and/or activity.

Such a striking surface may also have at least one opening formed therein, the opening preferably being smaller than the size of the ball to be struck during use of the corresponding ball game racket in a respective ball game sport and/or activity.

The ball game racket frame 12 comprises a fiber composite material having fibers embedded in a matrix. Preferably, at least 5%, more preferably at least 10%, of the fibers are natural fibers in at least one cross-section of a portion of the ball game racket frame 12.

The fiber composite material may also comprise synthetic fibers, preferably carbon and/or glass fibers.

The natural fibers may include fibers of at least one of the following fibers: flax, hemp, jute, kenaf, ramie, nettle, sisal, henequen, pineapple leaf fiber (PALF), Abaca, oil palm empty fruit bunch (OPEFB), oil palm mesocarp fiber (OPMF), cotton, coir, nanocellulose, bamboo, and banana tree.

The use of further natural fibers which are not listed above is also feasible.

The proportion, i.e., the percentage, of the natural fibers in the fiber composite material as provided above, e.g., at least 5%, more preferably at least 10%, relate to a percentage by volume of the natural fibers in the respective fiber composite material along a particular cross-section of the ball game racket frame 12.

Such a cross-section 28 is shown in exemplary fashion in FIG. 1.

As shown in FIG. 1, a portion of the peripheral section 26 of the head portion 14 is cut along a cutting line 29, which is substantially perpendicular to the direction in which the peripheral section 26 extends around the opening 24. The cutting line 29 is illustrated as a dashed line to show an imaginary cut along said cutting line 29.

Based on the resulting cross-section 28 across a portion of the peripheral section 26 of the ball game racket frame 12 along line 29, the proportion, i.e., percentage, of natural fibers in the fiber composite material in the cross-section 28, e.g., at least 5%, more preferably at least 10%, may be determined by the area of the natural fibers in relation to the area of the total fibers in said cross-section 28.

A plurality of cross-sections 28a, 28b, 28c, 28d, and 28e along several portions of the ball game racket frame 12 along a plurality of respective lines 29a, 29b, 29c, 29d, and 29e may be made to determine the proportion, i.e., percentage, of natural fibers in the fiber composite material of different portions of the ball game racket frame 12.

Thus, at least one cross-section, preferably a plurality of cross-sections, may be made in each of the head portion 14 and/or shaft portion 18 and/or grip portion 20 to determine the proportion, i.e., percentage, of natural fibers in the fiber composite material in the respective portion of the ball game racket frame 12.

For instance, a cross-section 28b, 28c, 28d, 28e along a portion of the grip portion 20 and/or the shaft portion 18, respectively, may have a first proportion, i.e., percentage, of natural fibers in the fiber composite material.

The shapes of the cross-sections 28, 28a, 28b, 28c, 28d, and 28e shown in FIG. 1 are for exemplary illustrative purposes only and do not necessarily reflect the actual cross-sections of the ball game racket frame 12 at the respective cross-section 28, 28a, 28b, 28c, 28d, and 28e. In fact, any cross-sectional shape may be used, e.g., circular, rectangular, or polygonal.

Preferably, at least 10% of the fibers in at least one cross-section 28b, 28c, 28d, 28e of the shaft portion 18 and/or the grip portion 20, respectively, are natural fibers.

Furthermore, a cross-section 28, 28a along a portion of the head portion 14 may have a second proportion, i.e., percentage, of natural fibers in the fiber composite material. The second proportion may be lower than the first proportion.

Preferably, at most 1%, more preferably at most 2%, of all the fibers in the head portion 14 in at least one cross-section thereof are natural fibers.

Providing proportions of natural fibers in different regions of the ball game racket frame 12, e.g., a higher proportion of natural fibers in the shaft portion 18 and/or in the grip portion 20 than in the head portion 14, may allow a certain region or regions of the ball game racket frame 12 to have higher or lower effects resulting from the natural fibers.

This may allow regions of the ball game racket frame 12 to be individually optimized with respect to a particular desired characteristic or characteristics.

Thus, providing the shaft portion 18 and/or the grip portion 20 with a higher proportion of natural fibers than in the head portion 14 may increase the force absorbance characteristics in the shaft portion 18 and/or in the grip portion 20.

Since the shaft portion 18 and/or the grip portion 20 of the ball game racket frame 12 are typically in direct contact with the user or are at least closer to the user's body part, e.g., the user's hand(s), which grips the grip portion 20, providing increased force absorbance characteristics in the shaft portion 18 and/or in the grip portion 20 may be a particularly effective and/or efficient way of decreasing the transfer of forces from the ball game racket frame 12 to the user's body. As a result, a more comfortable feeling to the user during use may be provided and/or the risk of injury to the user during user due to an excessive and/or brute transfer of force from the ball game racket frame 12 to the user's body may be reduced.

By providing a proportion of natural fiber in the shaft portion 18 and/or in the grip portion 20 of at least 10%, the properties of the natural fibers may positively affect the properties of the effects of the ball game racket frame 12, at least in the shaft portion 18 and/or in the grip portion 20, during use.

For instance, the degree of absorbance of forces by the ball game racket frame 12 may be increased and/or the sound characteristics of the ball game racket frame 12 when striking a ball during use may be improved and/or be more appealing to the user and/or to persons nearby as described above, at least in part as a result of the natural fibers.

By providing a proportion of natural fiber in the head portion of at most 1%, more preferably at most 2%, the properties of the natural fibers may affect and/or alter the characteristics of the head portion 14, in particular during use of the ball game racket frame 12, to a lesser degree than in the shaft portion 18 and/or in the grip portion 20, respectively, when at least 10% of the fibers in the shaft portion 18 and/or in the grip portion 20 in at least one cross-section thereof are natural fibers.

This may be desirable, e.g., to increase the stiffness in the head portion 14 by using a higher proportion of synthetic fibers, e.g., carbon fibers, which may provide a higher stiffness than natural fibers in the head portion 14. Achieving a higher stiffness in the head portion 14 may be more important than in the shaft portion 18 and/or in the grip portion 20.

On the other hand, the shaft portion 18 and/or the grip portion 20 may benefit from a higher proportion of natural fibers in that the damping characteristics may be increased in the shaft portion 18 and/or the grip portion 20 as a result of the higher proportion of natural fibers provided therein.

Moreover, a reduced stiffness in the shaft portion 18 and/or the grip portion 20, compared with a configuration in which less natural fibers were to be used in the shaft portion 18 and/or the grip portion 20, may be less critical in the shaft portion 18 and/or the grip portion 20 than in the head portion 14.

Furthermore, the increased damping and/or sound-altering effects of the natural fibers in the shaft portion 18 and/or the grip portion 20, as detailed above, may outweigh the reduced stiffness which may be caused by the natural fibers compared with high-strength synthetic fibers, e.g., carbon fibers.

As mentioned previously, a variety of different natural fibers may be used in the ball game racket frame 12. The natural fibers may include of at least one of the following fibers: flax, hemp, jute, kenaf, ramie, nettle, sisal, henequen, pineapple leaf fiber (PALF), Abaca, oil palm empty fruit bunch (OPEFB), oil palm mesocarp fiber (OPMF), cotton, coir, nanocellulose, bamboo, and banana tree.

A combination of any of the above-identified types of natural fibers may also be used in the ball game racket frame 12.

It is also feasible that a first type or types of natural fibers is/are used in a first portion of the ball game racket frame 12, e.g., in the head portion 14, and a second type or types of natural fibers is/are used in a second portion of the ball game racket frame 12, e.g., in the shaft portion 18 and/or in the grip portion 20, wherein the first type or types of natural fibers differ(s) from the second type or types of natural fibers.

In case a plurality of different types of natural fibers, e.g., flax and hemp, are used in the first portion of the ball game racket frame 12 and a single type or a plurality of different types of natural fibers, e.g., flax and jute, are used in the second portion, then the types of natural fibers used in the first portion may be identical or may partially, i.e., only some of the types, be the same as the type or types of natural fibers used in the second portion of the ball game racket frame 12.

The ball game racket frame 12 may be at least partially coated by a thermoplastic layer, at least in some regions of the ball game racket frame 12 having natural fibers.

The thermoplastic material of the thermoplastic layer may comprise at least one of polyamide (PA), polylactides (PLA), and Polyethylene terephthalate (PET).

The thermoplastic layer may have a layer thickness ranging from 0.1 to 0.3 mm at least partially along the ball game racket frame 12.

Alternatively, or additionally, the ball game racket frame 12 may at least partially be coated by a powder coating layer, at least in some regions of the ball game racket frame 12 having natural fibers.

The powder coating layer preferably includes at least one of the following materials: thermoplastic powder and duroplastic powder.

The powder coating layer may have a layer thickness ranging from 80 μm to 150 μm.

As detailed in the beginning, natural fibers tend to have a relatively high degree of moisture absorption. Moisture absorption by the natural fibers may lead to a reduction in stiffness of the ball game racket frame 12, which may be undesirable and/or detrimental to the performance of the ball game racket 10. This is particularly relevant for many ball game racket frames 12 since, in many instances, ball game rackets 10 are used outdoors, where they may be subjected to more severe and/or moist conditions, e.g., rain, than indoors.

Thus, by coating the ball game racket frame 12 at least partially with a thermoplastic layer and/or a powder coating layer the risk of moisture penetrating the ball game racket frame 12 and being absorbed by the natural fibers may be eliminated or at least reduced by providing a barrier between the natural fibers and the, potentially moist and/or humid, environment.

The natural fibers may have been treated by washing the natural fibers with at least one of the following materials prior to being embedded in the respective matrix: an alkaline solution, water with a PH value ranging from 7 to 14, and enzymes.

Alternatively, or additionally, the natural fibers have been plasma treated prior to being embedded in the respective matrix.

As detailed at the beginning, natural fibers tend to have a natural protection layer surrounding at least sections thereof. This may decrease the adhesiveness of the natural fibers, e.g., the adhesiveness of the natural fibers to a matrix material in the composite material. This may, in turn, decrease the load transfer qualities from the matrix to the natural fibers and/or vice versa.

As a result, this may increase the total amount of fibers required in order to provide a desired stiffness of the ball game racket frame 12, which may increase the costs for manufacturing and/or the weight of the respective ball game racket frame 12.

By treating the natural fibers, e.g., by washing the natural fibers with at least one of the above-identified materials and/or by plasma treating the natural fibers, the adhesiveness of the natural fibers to a matrix material may be increased.

This may increase the load transfer qualities from the matrix to the natural fibers and/or vice versa and may decrease the total amount of fibers required in order to provide a desired stiffness of the ball game racket frame 12, which may decrease the costs for manufacturing and/or the weight of the respective ball game racket frame 12.

The invention claimed is:

1. A ball game racket frame including a head portion, a shaft portion and a grip portion, wherein the ball game racket frame comprises a fiber composite material having fibers embedded in a matrix, wherein at least 5% of the fibers are natural fibers in at least one cross-section of a portion of the ball game racket frame;
   wherein a proportion of natural fibers in at least one cross-section of the shaft portion and/or of the grip portion, respectively, is greater than a proportion of natural fibers in at least one cross-section of the head portion;
   wherein the proportion of natural fibers in the at least one cross-section of the shaft portion and/or of the grip portion and the proportion of natural fibers in the at least one cross-section of the head portion are both greater than zero.

2. The ball game racket frame according to claim 1, wherein the natural fibers include fibers of at least one of the following fibers: flax, hemp, kenaf, jute, and ramie.

3. The ball game racket frame according to claim 1, wherein at most 90% of the fibers are natural fibers.

4. The ball game racket frame according to claim 1, wherein the fibers comprise carbon and/or glass fibers.

5. The ball game racket frame according to claim 1, wherein at least 10% of the fibers in at least one cross-section of the shaft portion and/or of the grip portion, respectively, are natural fibers.

6. The ball game racket frame according to claim 1, wherein at most 2% of the fibers in at least one cross-section of the head portion thereof are natural fibers.

7. The ball game racket frame according to claim 1, wherein the ball game racket frame is at least partially coated by a thermoplastic layer, at least in some regions of the ball game racket frame having natural fibers.

8. The ball game racket frame according to claim 1, wherein the ball game racket frame is at least partially coated by a powder coating layer, at least in some regions of the ball game racket frame having natural fibers.

9. The ball game racket frame according to claim 8, wherein the powder coating layer includes at least one of the following materials: thermoplastic powder and duroplastic powder.

10. The ball game racket frame according to claim 1, wherein the natural fibers have been treated by washing the natural fibers with at least one of the following materials: an alkaline solution, water with a PH value ranging from 7 to 14, and enzymes.

11. The ball game racket frame according to claim 1, wherein the natural fibers have been plasma treated.

12. A ball game racket frame including a head portion, a shaft portion and a grip portion, wherein the ball game racket frame comprises a fiber composite material having fibers embedded in a matrix, wherein at least some of the fibers are natural fibers and wherein a proportion of natural fibers in at least one cross-section of the shaft portion and/or the grip portion, respectively, is greater than a proportion of natural fibers in at least one cross-section of the head portion;
wherein the proportion of natural fibers in the at least one cross-section of the shaft portion and/or of the grip portion and the proportion of natural fibers in the at least one cross-section of the head portion are both greater than zero.

13. The ball game racket frame according to claim 12, wherein at least 10% of the fibers in at least one cross-section of the shaft portion and/or of the grip portion, respectively, are natural fibers.

14. A method for manufacturing a ball game racket frame, including the following steps:
a) providing at least one prepreg layer having fibers, including natural fibers, embedded in a matrix;
b) forming the ball game racket frame at least partially from the prepreg layer, such that at least 5% of the fibers in at least in one cross-section of a portion the ball game racket frame are natural fibers;
wherein a proportion of natural fibers in at least one cross-section of a shaft portion and/or of a grip portion of the ball game racket frame, respectively, is greater than a proportion of natural fibers in at least one cross-section of a head portion of the ball game racket frame;
wherein the proportion of natural fibers in the at least one cross-section of the shaft portion and/or of the grip portion and the proportion of natural fibers in the at least one cross-section of the head portion are both greater than zero.

15. The method according to claim 14, wherein the prepreg layer provided in step a) further has synthetic fibers embedded in the matrix.

16. The method according to claim 14, wherein the natural fibers are treated in at least one fiber treatment process prior to being embedded in the matrix, the fiber treatment process including at least one treatment process of the following group: washing the natural fibers with an alkaline solution, washing the natural fibers with water having a PH value ranging from 7 to 14, washing the natural fibers with enzymes, and a plasma treatment.

17. The method according to claim 16, wherein the natural fibers are washed with enzymes using at least one of the following enzymes: lipases, proteases, and peroxidases.

18. The method according to claim 16, wherein the plasma treatment is performed using a reaction gas including at least one of the following group: methane, ethane, and ethene.

19. The method according to claim 14, further comprising at least partially coating the ball game racket frame, at least in some regions of the ball game racket frame having natural fibers, by at least one coating process including at least one of the following group: a thermoplastic coating process and a powder coating process.

20. The method according to claim 14, wherein the natural fibers include at least one of the following fibers: flax, hemp, kenaf, jute, and ramie.

* * * * *